Figure 1:
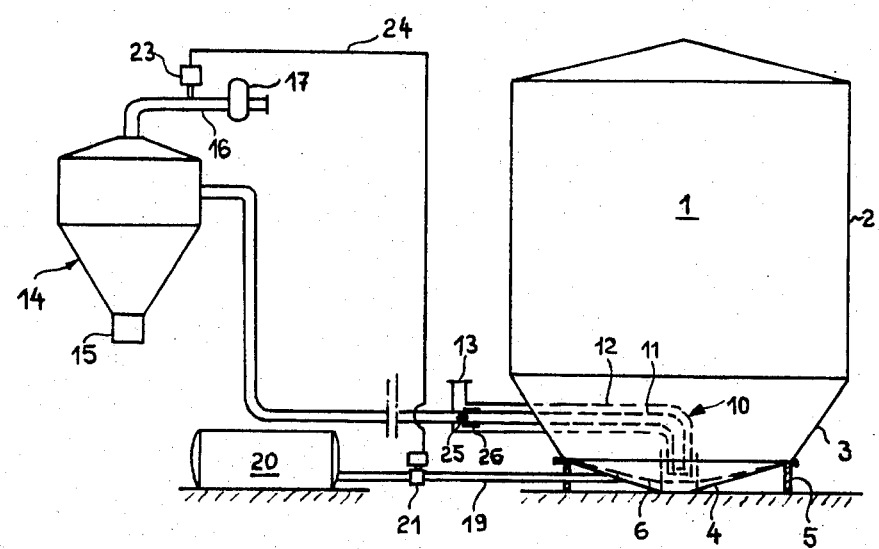

United States Patent
Lesk et al.

[11] 3,861,753
[45] Jan. 21, 1975

[54] METHOD OF AND APPARATUS FOR DISCHARGING PULVERULENT MATERIAL FROM SILOS OR THE LIKE

[75] Inventors: Adolf Lesk; Adolf Zimmerman; Otmar Link, all of Osterburken, Germany

[73] Assignee: Adolf Zimmerman Maschinenbau, Osterburken, Germany

[22] Filed: July 17, 1972

[21] Appl. No.: 272,654

[30] Foreign Application Priority Data
July 17, 1971 Germany.......................... 2135832

[52] U.S. Cl.................................. 302/52, 222/195
[51] Int. Cl............................................ B65g 53/40
[58] Field of Search............ 302/27, 26, 53, 54, 45, 302/52; 222/52, 195

[56] References Cited
UNITED STATES PATENTS
| | | | |
|---|---|---|---|
| 3,097,828 | 7/1963 | Grun | 222/195 X |
| 3,249,263 | 5/1966 | Howard | 222/195 X |
| 3,411,666 | 11/1968 | Schmelling | 222/195 X |
| 3,637,115 | 1/1972 | Holm | 222/195 |
| 3,645,583 | 2/1972 | Heath | 222/195 X |

*Primary Examiner*—Robert B. Reeves
*Assistant Examiner*—Hadd Lane
*Attorney, Agent, or Firm*—Craig & Antonelli

[57] ABSTRACT

A method of discharging pulverulent material, more particularly material having poor flow characteristics, from silos or similar pressureless containers, the material being loosened in the region of the discharge point by means of compressed air introduced in pulses from below, the method being characterized in that the air is supplied at intervals of some tens of seconds in pressure pulses of from 1 atmosphere gauge for periods of up to a few tenths of a second.

Apparatus for carrying out the method comprises a pneumatic or mechanical discharge device comprising an air permeable loosening base and a valve controlling the compressed air pulses, the valve having opening times which are adapted to be preset and the time control system for the opening intervals.

35 Claims, 2 Drawing Figures

PATENTED JAN 21 1975    3,861,753

METHOD OF AND APPARATUS FOR DISCHARGING PULVERULENT MATERIAL FROM SILOS OR THE LIKE

This invention relates to a method of, and apparatus for, discharging pulverulent material, more particularly material having poor flow characteristics, from silos or similar pressureless containers, the material being loosened in the region of the discharge point by means of compressed air introduced in pulses from below.

While there is generally no difficulty in withdrawing materials having good flow characteristics, products having limited or poor flow properties, for example flour, give rise to problems because the material is conveyed away only in the zone of the withdrawal point. If the material has poor flow properties, the material will not slide into the position previously occupied by the material that has been discharged, so that a crater soon forms at such places and conveyance stops. Similarly, craters and hollows form elsewhere as the material slides down and result in uneven bulk density and hence uneven discharge capacity. This disadvantage is emphasised when the material tends to cake at the surface and the forces acting on the material during discharge are not sufficient to break up cakes forming in this way, so that such cakes clog the discharge point and may stop conveyance.

Fluidising bases, i.e., air-permeable bases, have been used as discharge aids (German Auslegeschrift 1,176,572, U.K. Patent Specification 887,309). The continuous injection of air is intended to fluidise the material. If this method is applied to products having poor flow characteristics, hollows soon form from initial cracks to which there is a greater air inflow, and these hollows extend to the surface of the material. The air accordingly leaves the material and flows out of the surface thereof with practically no effect. This method operates not only with a high air consumption, but also with a high pressure such that air passes through the entire height of the material. Another disadvantage is that the air is unable to break up any caking sufficiently to prevent clogging and malfunctioning of the installation. With such fluidising bases, therefore, provision is also made for them to be made from resilient material, so that they lift when subjected to compressed air and cause any hollows or craters to collapse.

Another method is known (East German Patent Specification 77 667), in which the continuously introduced loosening air is excited by means of a vibrator in order to improve the flow characteristics by means of the frequencydependent pressure variations.

Finally, methods are known (UK Patent Specification 831,227, East German Patent Specifications 71 512, 56 222 and German Patent Specification 653,921), wherein the material is removed from the container by gravity and is loosened pulse-wise in the region of the discharge cone by means of compressed air from nozzles of varying cross-section. Controlled introduction of the compressed air in this way is effective in practice only if the nozzles are disposed precisely at those places at which there is a predominant formation of bridges or craters and this, of course, always depends upon the construction of the container and the consistency of the material and its affinity to the material of the container wall.

While all the fluidising bases have substantially constant and high compressed air requirements in order to ensure continuous passage of air through the material so that the latter is fluidised, the methods in which the material is withdrawn by gravity generally have reduced, although still considerable, air requirements. The air requirements increase with decreasing inclination of the container base and decreasing discharge velocity. Even in cases in which the compressed air is applied only in pulses, the quantity of air can be reduced by only approximately half, since the intervals between the pressure pulses are equal to, or only insignificantly longer than the pressure pulse duration.

The object of the present invention is to provide a method which enables material having poor flow characteristics to be discharged even by suction with very much reduced air requirements.

To this end, in a method as referred to, according to the present invention the air is applied at intervals of some tens of seconds in pressure pulses of from 1 atmosphere gauge for periods of up to a few tenths of a second.

The invention enables materials having restricted or poor flow characteristics, for example, flour, to be withdrawn from pressureless containers, more particularly silos, without difficulties and with very low loosening air consumption. It has been found in practice that the pressure pulses of a few tenths of a second are sufficient to obtain uniform discharge, since any cavities and cakes within the material collapse in the region of the discharge point. It is possible to provide either gravity withdrawl via a discharge chamber, or pneumatic withdrawal by suction, the latter being preferable for a number of reasons and being applicable for the first time, as a result of the invention, to materials having poor flow properties.

Since the intervals between the pressure pulses are in excess of the latter by more than a power of ten, the air consumption can be reduced to about 10% as compared with the known fluidising bases, so that the method is considerably superior economically. This is based on the following consideration:

It would appear to be sufficient to supply air to the bulk of material only in the immediate vicinity of the discharge point - i.e., the entry of the material for conveyance in the case of pneumatic conveyor installations or the outlet from the silo in the case of gravity withdrawal. The storage characteristics of the material thus change in this zone and the material becomes flowable. Some of the air leaves the container together with the bulk material while another very small part of the air escapes through the column of bulk material upwardly and has to be replaced by freshly injected air. The intervals between the pressure pulses depend mainly on the basic characteristics of the bulk material, for example fineness, bulk weight, adhesion characteristics and so on and the height of the material and storage time. Tests have shown that an interval of 60 seconds with a pressure pulse of 0.1 second is sufficient in the case of commercial flour with a bulk material height of 2 metres, so that the "standstill time" is 600 times the "operating time."

According to another feature of the invention, in the above method in which mechanical movements are introduced into the material in addition to the pressure pulses, the said movements are introduced into the material solely in the region of the discharge point, and the movement can be produced by the pressure pulses themselves, as known per se.

If the material is withdrawn by suction then according to the invention the intervals between the pressure pulses are controlled in dependence on the final pressure and hence the conveying capacity of the complete conveyor installation.

Since a high column of material in the silo counteracts the penetration of the loosening air, the amount of air required depends upon the level to which the silo is filled. Unlike fluidising bases, therefore, this means that an increasing number of pressure pulses per unit of time has to be introduced into the material with decreasing level of filling. Since the flow characteristics deteriorate as a result of the air escaping from the region of the withdrawal point, and hence the conveying capacity drops, resulting in a reduction of the suction system in the case of pneumatic suction conveyance, according to the invention the opening intervals of the valve initiating the pressure pulses can be controlled by means of these variations in the suction and hence uniform conveying capacity can be obtained.

With suction withdrawal, the conveying capacity can be adjusted by adding additional air in known manner, with control if required, to the suction stream leaving the silo.

For carrying out the above method, the invention starts with a known apparatus (in U.K. Patent Specification 887,309) comprising a pneumatic or mechanical discharge device comprising an air-permeable loosening base and a valve controlling the compressed air pulses, characterised according to the invention in that the valve has opening times which are adapted to be pre-set and a time control system for the opening intervals. The time control system may also be arranged for adjustment to constant opening intervals.

In a preferred embodiment, the loosening base is of resilient construction free from support and, for example, consists of a fabric. The advantage of this is that there is a mechanical movement of the base in addition to the compressed air pulses and this not only assists in breaking down the craters and hollows, but also particularly loosens any caking near the discharge point.

The loosening base is fixed solely, on the one hand, between the silo wall and silo base, and on the other hand in the region of the discharge point, the distance between the loosening base and the silo base preferably decreasing outwardly from the central discharge point, so that the pressure pulses and the mechanical movements produced by them act primarily at the discharge point.

According to a further feature of the invention, in the case of suction withdrawal, the closure intervals of the control valve are controlled by a pressure monitor disposed at the end of the air conveying path. The suction picked up by the pressure monitor is proportional to the conveyor power and opens the valve as soon as the flow of material decreases, so that an automatic troublefree withdrawal is obtained.

The suction pipe leaving the silo may have an additional air aperture as known per se, of adjustable cross-section so that the value of the conveying capacity is adpated to be predetermined. Fine metering is possible by arranging for the cross-section of the additional air aperture to be controllable in dependence on the amount of material separated from the stream of material. If, as is frequently the case, the material is separated and weighed in a hopper weigher, this control may be effected immediately from the weigher.

Figure 2:
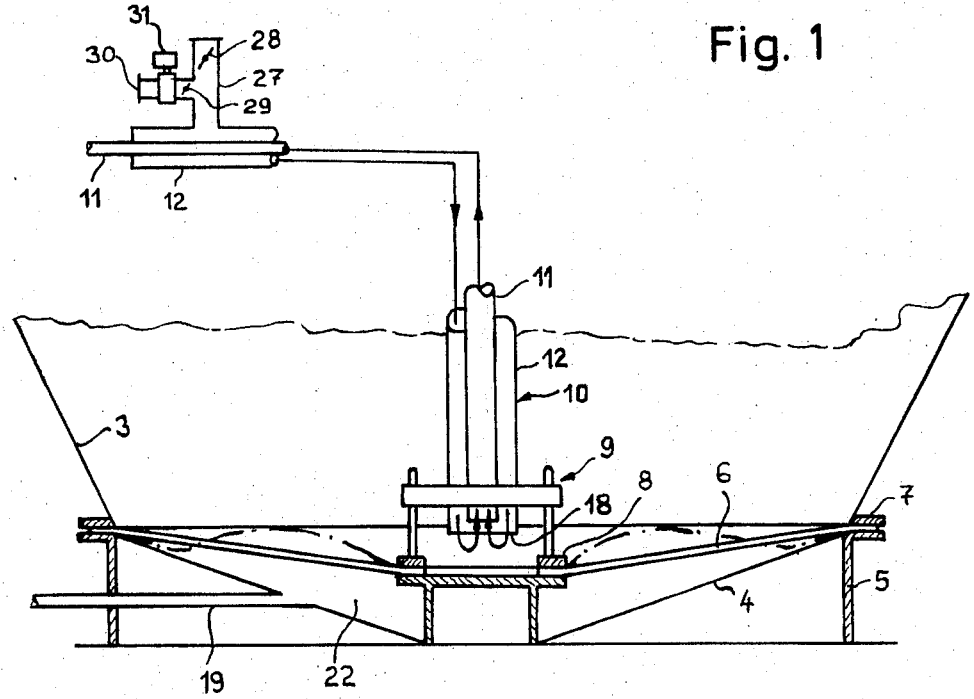

Further features, details and advantages of the invention will be apparent from the following description of one preferred embodiment shown in the accompanying drawing, wherein:

FIG. 1 is a diagrammatic elevation of a pneumatic suction conveyor system showing the silo and separator or hopper weigher in partial section; and FIG. 2 is an enlarged view of the bottom part of the silo with a power control system.

The silo 1 comprises a cylindrical portion 2 and a base 3 which initially has a steep conical configuration and which is followed by a base 4 having a shallow conical configuration. A supporting ring 5 is secured between the bases 3 and 4 to support the silo on the ground.

An air-permeable loosening base 6 is disposed above the base 4 and is secured in a flange 7 and in another flange 8 in the central zone. The base 6 is of resilient construction and consists, for example, of a fabric, so that it can bulge from the position shown in solid lines in FIG. 2 into the chain-dotted positions.

The flange 8 is part of a support having the general reference 9 for a suction nozzle 10, which is introduced into the silo and which, for example, consists of two concentric rubber tubes 11 and 12. The outer tube 12 is open to atmosphere via a spigot 13, while the inner tube 11 is connected, as a suction pipe, to the other parts of the plant.

In the exemplified embodiment illustrated, the suction pipe 11 leads to a separator 14, which may also be constructed as a hopper weigher and, for example, is provided with a discharge chamber 15. The suction required is produced by a suction fan 17 connected via a conduit 16 to the separator or hopper weigher 14. The suction fan draws air through the inlet spigot 13 and the other tube 12 of the suction nozzle 10, whereupon the air leaves the latter at 18 and is sucked into the inner tube 11 as shown by the arrows, and thus passes to the separator 14.

As the air passes from the outer tube 12 into the inner tube 11, the material near the end of the nozzle is entrained and conveyed to the separator 14.

The space between the silo base 4 and the resilient fabric base 6 is connected via a conduit 19 to a compressed air source 20 which, for example, delivers compressed air at a pressure of 1 atmosphere gauge or more. The conduit 19 contains a valve, for example a solenoid valve 21, which controls the pressure pulses introduced into the space 22 and hence into the material. To enable the sequence of pressure pulses to be controlled in dependence on the flow characteristics of the material in the region of the discharge point 18, a pressure monitor 23 is provided upstream of the suction fan 17 and opens the solenoid valve 21 via a conduit 24. While the opening time of the valve 21 is preset, the closure periods are controlled by the pressure monitor 23. The amount of material sucked in by the suction pipe 11 decreases, and the pressure monitor 23 opens the valve 21 with increasing frequency, in proportion as the inflow of material to the discharge point decreases.

An aperture 25 which is formed in the suction pipe 11 leaving the silo 1, and into which additional air can be sucked, is used for adjustment of the conveying capacity. The cross-section of the aperture 25 is adapted to be covered by a sliding sleeve 26 for manual adjustment purposes.

Alternatively, to allow automatic control within given ranges, more particularly for fine metering, an arrangement as shown in FIG. 2 may be provided for example. In this case, an additional air conduit 27 leads into the suction pipe 11 and contains a butterfly valve 28, which is adapted to be pre-set. A conduit 30 containing another butterfly valve 29 and a solenoid valve 31 leads into the additional air conduit 27. The maximum conveying capacity required is initially pre-set by means of the butterfly valve 28. Fine metering with reduced conveying capacity, on the other hand, is predetermined by the setting of the butterfly valve 29. For fine metering purposes, the valve 31 is controlled, for example, in dependence on the quantity of material accumulating on the hopper weigher.

As will be apparent from the drawing, the distance between the loosening base 6 at the silo base 4 decreases in the outward direction so that the quantity of air flowing through the loosening base per pressure pulse and the mechanical movement of the loosening base are at their maximum values in the region of the discharge point 18.

Instead of the suction flow shown in the drawing, gravity discharge is also possible, in which case the silo base 4 will, in known manner, have a central outlet through which the material is discharged downwardly.

We claim:

1. A method of discharging pulverent material from a container comprising:
    passing the material through a discharge opening of the container,
    loosening the material in the area of the discharge opening by introducing pressurized gas pulses of predetermined time duration and at predetermined time intervals into said material, wherein the predetermined time interval between the pulses is at least ten times the predetermined time duration of each pulse, and
    removing the material from the discharge opening by means of a suction conveyor installation, and controlling the predetermined time interval between the pulses as a function of the pressure in said suction conveyor installation such that the frequency of the pulses is changed in response to changes in pressure in said suction conveyor installation.

2. A method as claimed in claim 1 in which additional air is added for capacity control purposes in known manner to the suction flow from the silo.

3. A method according to claim 1, wherein the predetermined time interval between pulses is at least 10 seconds, and wherein the predetermined time duration of each pulse is less than 1 second.

4. A method according to claim 3 wherein said predetermined time duration of each pulse is greater than one tenth of a second.

5. A method according to claim 4, wherein said pressurized gas pulses are introduced into said material from below.

6. A method according to claim 5, wherein said pressurized gas pulses are introduced immediately adjacent said discharge opening.

7. A method according to claim 6, further comprising introducing a mechanical movement into the material to aid in loosening the material, said mechanical movement being introduced only adjacent the discharge opening.

8. A method according to claim 7, wherein said mechanical movement is introduced by a gas permeable member which is moved in response to said gas pulses.

9. A method according to claim 7, wherein said pressurized gas pulses are air pulses.

10. A method according to claim 3, wherein said pressurized gas pulses are air pulses.

11. A method according to claim 1, wherein said pressurized gas pulses are introduced into said material from below.

12. A method according to claim 11, wherein said pressurized gas pulses are introduced immediately adjacent said discharge opening.

13. A method according to claim 1, further comprising introducing a mechanical movement into the material to aid in loosening the material, said mechanical movement being introduced only adjacent the discharge opening.

14. A method according to claim 1, wherein the time interval between the pulses is controlled such that the frequency of pulses becomes greater as the height of the material in the container is decreased.

15. A method according to claim 1, wherein the time interval between the pulses is controlled such that the frequency of the pulses increases with a change in pressure in said suction conveyor installation corresponding to a decrease in the rate of material conveyance thereby.

16. Apparatus for discharging pulverized material from a container, comprising:
    a discharge opening in said container,
    loosening means for loosening the material in the area of the discharge opening by introducing pressurized gas pulses of predetermined time duration and at predetermined time intervals into said material,
    control means for controlling the pulses such that the predetermined time interval between the pulses is at least ten times the predetermined time duration of each pulse, and
    a suction conveyor installation for removing the material from the discharge opening, wherein said control means includes means responsive to the pressure at the outlet end of said suction conveyor installation for controlling the predetermined time interval between said pulses such that the frequency of said pulses is changed in response to changes in the pressure at said outlet end.

17. Apparatus according to claim 16, wherein said control means includes means assuring that the predetermined time interval between the pulses is at least 10 seconds and that the predetermined time duration of each pulse is less than a second.

18. Apparatus according to claim 17, wherein said loosening means is arranged for introducing said pressurized gas pulses into said material from below.

19. Apparatus according to claim 18, wherein said pressurized gas pulses are introduced immediately adjacent said discharge opening.

20. Apparatus according to claim 16 further comprising means for introducing a mechanical movement into the material to aid the gas pulses in loosening the material.

21. Apparatus according to claim 20, wherein said mechanical movement is introduced by a gas permeable member which is moved in response to said gas pulses.

22. Apparatus according to claim 21, wherein said pressurized gas pulses are air pulses.

23. Apparatus according to claim 21, wherein said control means includes a valve controlling the compressed gas pulses.

24. Apparatus according to claim 23, wherein said gas permable member is of flexible construction.

25. Apparatus according to claim 24, wherein said gas permeable member consist of fabric.

26. Apparatus according to claim 23, wherein said gas permeable member is attached at a container outer wall and adjacent the discharge opening.

27. Apparatus according to claim 26, wherein said discharge opening is located at the bottom of the container at a central part of the container, and wherein the distance between the gas permeable member and a bottom base of said container decreases in the outward direction from the discharge opening.

28. Apparatus according to claim 27, wherein said loosening means includes means for introducing said gas pulses into said container between said bottom base and said gas permeable member.

29. Apparatus according to claim 28, wherein said bottom base is conical in shape and surrounds the discharge opening, and wherein said gas permeable member is annular shaped and positioned above said bottom base.

30. Apparatus according to claim 16, wherein said suction conveyor installation includes a suction pipe leading away from the discharge opening and an adjustable area aperture in said suction pipe for controlling the suction pressure therein.

31. Apparatus according to claim 30, wherein said aperture in said suction pipe is controlled in dependence on the quantity of said material separated from the stream of material in said suction pipe by means detecting the amount of said separated material.

32. Apparatus according to claim 16, wherein said control system includes means for maintaining a control valve for said gas pulses at constant opening intervals.

33. Apparatus according to claim 16, wherein said control system includes a control valve directly controlling said gas pulses and means for maintaining said control valve with constant predetermined time duration opening intervals such that the predetermined time duration for each of the pulses is constant, and wherein said means responsive to the pressure at the outlet end of said suction conveyor installation controls the predetermined time intervals between pulses by directly controlling the time interval between closing of said valve and the next opening thereof.

34. Apparatus according to claim 16, wherein said control means includes means for automatically increasing the frequency of said pulses in response to changes in pressure at said outlet end which correspond to a decrease in the amount of material being conveyed by the conveyor installation.

35. Apparatus according to claim 16, wherein said loosening means is arranged for introducing said pressurized gas pulses into said material from below.

\* \* \* \* \*